United States Patent Office 3,363,008
Patented Jan. 9, 1968

3,363,008
ISOMERIZATION OF ORTHO-PHENYL SUBSTITUTED PHENOLS
Allan S. Hay, Schenectady, N.Y., assignor to General Electric Company, a corporation of New York
No Drawing. Filed Mar. 1, 1965, Ser. No. 436,370
4 Claims. (Cl. 260—620)

ABSTRACT OF THE DISCLOSURE

Ortho-phenyl substituted phenols are isomerized to the corresponding meta-phenyl substituted phenols in the presence of aluminum chloride and thereafter acidifying the reaction mixture to convert the aluminum salt of the phenol to the free phenol and a water-soluble aluminum salt. The meta-phenyl substituted phenols are useful as antioxidants and the making of oil-soluble phenol-formaldehyde resins, phenyl ethers and other chemical derivatives.

---

This invention relates to the isomerization of certain phenols, substituted in the ortho-position with a phenyl group, to the corresponding phenol isomer where the phenyl group is substituted in the meta-position. More particularly, this invention relates to the isomerization of ortho-substituted phenols selected from the group consisting of o-phenylphenol, 2-chloro-6-phenylphenol and 2,6-diphenylphenol to their corresponding isomers where the phenyl substituent is in the meta-position. The process comprises reacting at least one of said ortho-substituted phenols with aluminum chloride, in the proportion of greater than 1 mole of aluminum chloride for each mole of said o-phenyl-substituted phenol to be isomerized, hydrolyzing the reaction mixture with an aqueous acid solution and thereafter separating the meta-phenyl substituted phenol isomer from the reaction mixture. By this process o-phenylphenol is isomerized to m-phenylphenol, 2-chloro-6-phenylphenol is isomerized to 2-chloro-5-phenylphenol and 2,6-diphenylphenol is isomerized first to 2,5-diphenylphenol and on further reaction, to 3,5-diphenylphenol.

Although meta-phenyl substituted phenols are old, they usually have been prepared by a very indirect process usually involving nitration of the corresponding phenyl substituted benzene followed by diazotization and transformation to the corresponding phenyl-substituted phenol. On the other hand, o-phenylphenol is a commercially available product. Chlorination leads to 2-chloro-6-phenylphenol, and 2,6-diphenylphenol is likewise a known chemical compound. It would be very desirable if a suitable and economical process could be found for the isomerization of such ortho-substituted phenylphenols to their corresponding meta-substituted isomers.

Generally, the isomerization of ortho-substituted alkyl phenols, with a catalytic amount of acid, leads to an equilibrium mixture of the ortho and para-substituted isomers. Olah and Meyer reported in J. Org. Chem. 27, 3682 (1962), that when o-terphenyls are isomerized with a catalytic amount of aluminum chloride that an equilibrium mixture consisting of approximately 62% m-terphenyl and 38% of p-terphenyl is produced. Unexpectedly, I have found that o-phenylphenol, 2-chloro-6-phenylphenol, or 2,6-diphenylphenol can be isomerized to meta-phenyl substituted isomers with aluminum chloride, providing the amount of aluminum chloride exceeds the amount of phenol on a molar basis. Insofar as I have been able to determine, no para-isomer is detected even when a very high yield of the meta-isomer is obtained. Furthermore, I have found that the corresponding p-phenyl substituted phenols are not isomerized to their meta-isomers. This was indeed surprising and therefore, provides a very economical method of isomerizing these ortho-substituted phenols to the corresponding meta-isomers. Generally, it will be desirable to only isomerize a single o-phenyl substituted phenol. However, if desired, a mixture of two or more of the stated phenols may be isomerized to produce a mixture of the m-phenyl isomers which can be used as a mixture or separated into the pure compounds by fractional distillation or crystallization.

Since 1 mole of aluminum chloride is consumed by reacting with the phenol to produce the corresponding aluminum salt, and an additional amount of aluminum chloride is required to catalyze the reaction, I therefore must use more than 1 mole of aluminum chloride for each mole of o-phenyl substituted phenol to be isomerized. If less aluminum chloride is used, only the aluminum salt is formed and no isomerization takes place. The excess over 1 mole needs to be only a catalytic amount, i.e., from 0.01 to 0.2 mole excess over the amount required to form the salt.

Since the o-phenyl substituted phenols as well as meta-isomers are solids at room temperature, the isomerization reaction is preferably carried out in the presence of a solvent which will dissolve the starting phenol and the isomerized product. The isomerization reaction will occur slowly at room temperature, but is greatly hastened by heating. Since the reaction with aluminum chloride can also lead to tarry products, especially if the temperature is too high, a compromise temperature is usually used to optimize the isomerization reaction, while minimizing the formation of tarry products. A temperature in the range of 75–150° C. is generally preferred. However, temperatures higher or lower than this may be used if desired. The choice of the solvent is dependent on the temperature desired. As will be readily ascertained by those skilled in the art, the solvent chosen should be nonreactive with the aluminum chloride. Useful solvents are the aromatic hydrocarbons and aromatic halohydrocarbons. Chlorobenzene is a particular advantageous solvent to use since it is readily available at low cost, is nonreactive in my reaction system, and has a boiling point of 132° C. which permits the isomerization reaction to be carried out at temperatures up to its boiling point without the use of pressure equipment.

As previously stated, the aluminum chloride first reacts with the phenol to produce the corresponding salt. This reaction is complete by the time that evolution of hydrogen chloride ceases. By this time, the isomerization reaction has commenced and proceeds rapidly thereafter. In general, reaction times of 30 minutes to 2 hours at 100° C. produces high yields of the m-phenyl isomers. However, if desired, a longer reaction temperature may be used and is sometimes preferable, espcially if, as in the case of 2,6-diphenylphenol, it is desirable to isomerize the starting phenol so that both phenyl groups in the ortho-position are transposed to the meta-position. After the isomerization reaction is carried to the desired degree of completion, the reaction mixture is hydrolyzed with an aqueous acid solution which forms a water soluble aluminum salt, generally an aqueous mineral acid solution, to convert the aluminum salt of the phenol to the free phenol.

The organic layer containing the phenolic product is separated from the aqueous layer containing the aluminum salt. The product can be separated from the organic layer by fractional distillation, if desired. In general, I have found it more desirable to first extract the organic layer with an aqueous alkali metal hydroxide solution as a preliminary purification step, since the meta-phenyl substituted phenol products are soluble in aqueous alkali leaving most of the non-phenolic impurities in the organic layer. Since 2,6-diphenylphenol is unsoluble in aqueous alkali, it likewise will be removed in this step when it is the phenol which is isomerized. The aqueous alkaline solution after separation from the organic layer is acidified to convert the alkali metal salt of the phenol product to the free phenol. The free phenol product is then extracted from the aqueous layer with an organic solvent from which it is readily separated by fractional distillation. These intermediate purification steps are desirable, but are not necessary steps in the practice of my invention.

In order that those skilled in the art may better understand my invention, the following examples are given by way of illustration and not by way of limitation. All percentages and parts are by weight unless otherwise specifically stated.

Example 1

A mixture of 300 g. of o-phenylphenol, 500 ml. of chlorobenzene and 300 g. of anhydrous aluminum chloride was placed in a 2-liter 3-necked round bottom flask equipped with a stirrer, condenser and thermometer. The reaction mixture was stirred by heating on a steam bath for a period of one hour. At the end of this time, the reaction mixture was added to the mixture of ice and dilute hydrochloric acid. After the ice had melted, the organic layer was separated and washed twice with dilute hydrochloric acid. The organic layer was extracted and with an aqueous 10% sodium hydroxide solution separated from the organic layer. After acidification of the aqueous layer, it was extracted with diethyl ether. The organic layer was separated from the aqueous layer and dried over magnesium sulfate. After filtering off the magnesium sulfate, the ether was evaporated on a steam bath and the residue was distilled at 20 mm. pressure, through a Vigreux fractionation column. Two fractions were isolated; one fraction weighing 131.7 g. boiled in the range of 144–164° C. and the second fraction weighing 120.9 g. boiling in the range 164–170° C. There was 17 g. of tarry residue left in the distillation flask. Fraction 1 was found to be a mixture of 73% o-phenylphenol and 27% m-phenylphenol. This mixture is readily separated into its two components by careful fractional distillation. Fraction 2 was found to be substantially pure m-phenylphenol, having a melting point of 75–77° C. A single recrystallization from heptane raised the melting point to 78° C. showing that both fraction 2 and its recrystallized product were purer m-phenylphenol than that previously reported in the literature as having a melting point of 74–75° C. by Ames and Davey in J. Chem. Soc., 1957, 3480, and a melting point of 75° C. by Cassebaum in J. Prakt. Chem. 13, (4), 141 (1961). The total yield of m-phenylphenol was 156.4 g., representing a yield of 77% of the initial o-phenylphenol. No p-phenylphenol could be detected in either fraction.

Example 2

In a manner similar to that in Example 1, a mixture of 25 g. of 2,6-diphenylphenol, 17 g. of aluminum chloride and 50 ml. of chlorobenzene was reacted for one hour at 100° C. In this example, since 2,6-diphenylphenol is insoluble in aqueous alkali solution, the organic layer remaining after the extraction and separation from the aqueous sodium hydroxide solution was evaporated. There was less than 1 g. of unreacted 2,6-diphenylphenol recovered. After acidification of the aqueous alkaline solution, there was obtained 10 g. of product which began melting at 120° C., showing that it was a mixture of products. After two recrystallizations from a heptane ethyl acetate mixture (50–50 by volume), 5.2 g. of 2,5-diphenylphenol was obtained having a melting point of 194.5–196° C. compared to a melting point of 194° C. given in the literature. By increasing the reaction time, some of the 2,5-diphenylphenol product is further isomerized to 3,5-diphenylphenol.

Example 3

In a manner similar to Example 1, a mixture of 120 g. of 2-chloro-6-phenylphenol, 100 g. of aluminum chloride and 175 ml. of chlorobenzene was reacted at 100° C. for one hour. Distillation after the acidification of the aqueous alkaline solution gave 93 g. of product boiling at 175° C. at 20 mm. pressure and having a melting point of 50° C. There was no change in melting point after recrystallization of the product from heptane. Elemental analysis showed that it contained 70.8% C., 4.6% H., and 16.4% Cl., compared to 70.4% C., 4.4% H., and 17.2% Cl. calculated for $C_{12}H_9ClO$. When a sample of this product was subjected to thin layer of chromatography, only one compound was found. The infrared spectrum of this product showed that it had a different infrared spectrum than the starting material and the other possible isomeric product 2-chloro-4-phenylphenol. Because of steric hindrance, the product could not be 2-chloro-3-phenylphenol. Therefore, the product was 2-chloro-5-phenylphenol.

The products of my invention have a wide variety of uses. They can be used, for example, as antioxidants, but have particular utility for the making of oil soluble phenol-formaldehyde resins, since by the isomerization reaction at least one ortho-position which is aldehyde reactable is made available for the aldehyde reaction. The products of my invention are also useful for esters and other chemical derivatives.

While the present invention has been described by reference to particular embodiments and examples, therefore, variations will readily occur to those skilled in the art. It is therefore intended, in the appended claims, to cover all equivalents as may be in the true spirit and scope of the foregoing description, without departing from the scope of the invention.

What I desire to secure by Letters Patent of the United States is:

1. The process of isomerizing o-phenyl substituted phenols selected from the group consisting of o-phenylphenol, 2-chloro-6-phenylphenol and 2,6-diphenylphenol to their corresponding m-phenyl substituted phenol isomers which comprises (a) reacting a solution of at least one of said o-phenyl substituted phenols with aluminum chloride, in the proportions of greater than 1 mole of aluminum chloride for each mole of said o-phenyl substituted phenol to be isomerized, (b) acidifying the reaction mixture with an aqueous acid solution to convert the aluminum salt of the phenol to the free phenol and a water-soluble aluminum salt and (c) separating the m-phenyl substituted phenol isomeric product from the reaction mixture.

2. The process of claim 1 wherein the phenol is o-phenylphenol.

3. The process of claim 1 wherein the phenol is 2-chloro-6-phenylphenol.

4. The process of claim 1 wherein the phenol is 2,6-diphenylphenol.

References Cited

Baddeley, G., "The Action of Aluminum Chloride on Some Phenol Homologues," Chem. Soc. Journal, pp. 527–31, 1943.

LEON ZITVER, *Primary Examiner.*

DANIEL D. HORWITZ, *Examiner.*

H. W. ROBERTS, *Assistant Examiner.*